(12) United States Patent
Aljadeff et al.

(10) Patent No.: US 7,403,108 B2
(45) Date of Patent: Jul. 22, 2008

(54) ENHANCED AREA SEPARATION IN WIRELESS LOCATION SYSTEMS AND METHOD

(76) Inventors: Daniel Aljadeff, 5 Ariozorov Street, Kiriat Ono (IL) 55550; Reuven Amsalem, 3 Keshet Street, Nes-Ziona (IL) 74027; Gabi Daniely, 2, Hameyasdim, apt. 13, Kiryet Ono (IL) 55000; Jonathan Chashper, 1633 E. Jefferson, Rockville, MD (US) 20852

( * ) Notice: Subject to any disclaimer, the term of this patent is extended or adjusted under 35 U.S.C. 154(b) by 38 days.

(21) Appl. No.: 11/466,540

(22) Filed: Aug. 23, 2006

(65) Prior Publication Data

US 2007/0046460 A1   Mar. 1, 2007

Related U.S. Application Data

(60) Provisional application No. 60/712,747, filed on Aug. 30, 2005.

(51) Int. Cl.
  *G08B 23/00* (2006.01)
  *G08B 13/14* (2006.01)
  *H04Q 7/00* (2006.01)
(52) U.S. Cl. ............... 340/500; 340/572.1; 340/539.13; 340/825.36; 340/825.49
(58) Field of Classification Search .................. 340/500
    See application file for complete search history.

(56) References Cited

U.S. PATENT DOCUMENTS

| | | | | | |
|---|---|---|---|---|---|
| 5,218,344 | A | * | 6/1993 | Ricketts | 340/573.4 |
| 6,674,403 | B2 | * | 1/2004 | Gray et al. | 342/463 |
| 6,720,922 | B2 | * | 4/2004 | Williams et al. | 342/465 |
| 6,839,027 | B2 | * | 1/2005 | Krumm et al. | 342/465 |
| 6,963,289 | B2 | * | 11/2005 | Aljadeff et al. | 340/825.49 |
| 7,095,319 | B2 | * | 8/2006 | Izumi et al. | 340/539.11 |

* cited by examiner

*Primary Examiner*—Donnie L Crosland
(74) *Attorney, Agent, or Firm*—Jeffrey D. Moy; Weiss & Moy, P.C.

(57) ABSTRACT

A system and method for tracking and locating wireless tags by a wireless location system in limited and well defined areas that provides for differentiation between the well defined areas comprises transmitting identifying area information by short range transmitters, at least one short range transmitter positioned in the proximity of an entry and exit point of each well defined area. The wireless tags receive the identifying area information when in coverage range of one of the short range transmitters. The wireless tags will transmit the identifying information in the tag message. The transmission will include the last identifying information received and accepted by the wireless tag. A plurality of location receivers and/or access points are installed in or in the proximity of the well defined areas for locating the wireless tags.

20 Claims, 3 Drawing Sheets

ENHANCED AREA SEPARATION IN WIRELESS LOCATION SYSTEMS AND METHOD

RELATED APPLICATION

This application is related to U.S. Provisional Application Ser. No. 60/712,747, filed Aug. 30, 2005, in the name of the same inventors listed above, and entitled, "ENHANCED AREA SEPARATION IN WIRELESS LOCATION SYSTEMS AND METHOD". The present patent application claims the benefit under 35 U.S.C. §119(e).

FIELD OF THE INVENTION

The present invention relates generally to wireless location systems where it is essential to absolutely locate a unit being tracked or located (e.g. wireless tag) in a limited and well defined area, and more specifically, to a method for absolute area differentiation without the need of expensive infrastructure deployment. The present invention offers a simple method of dynamically programming a transmitter (tracked unit) to allow the location system to absolutely differentiate between areas.

BACKGROUND OF THE INVENTION

In wireless location systems where it is essential to absolutely locate a unit being tracked or located (e.g. wireless tag) in a limited and well defined area, area or room differentiation is traditionally done in one of several different manners. For example, area or room differentiation may be accomplished by measuring the strength of the received signal, by RFID methods, or by detecting infrared or ultrasonic signals.

The "signal strength" (Received Signal Strength Indication—RSSI) method's differentiation is poor in terms of accuracy and reliability, as the path loss is highly dependent on environmental conditions and affected by fading due to multi path propagation. In indoor office environments, where room differentiation is required, the reliability of this method is highly dependent on the wall materials and the level of RF signal attenuation between two adjacent areas (e.g. two sides of a wall). In outdoor and/or open areas (e.g. manufacturing areas, warehouses, etc.), this method is completely unreliable and does not permit to absolutely differentiate between two adjacent areas (e.g. separated by a fence, canal or low wall).

RFID methods use short range transmitters or readers to detect tags in their proximity. Those methods are reliable both in closed or open areas but require a heavy infrastructure to fully cover the located areas.

Other methods using infrared and/or ultrasonic signals are also very unreliable in outdoor and/or open areas. In indoor closed areas they perform much better but require constant coverage of the applicable sensors. Infrared systems require line-of-sight while ultrasonic systems are limited in range and exposed to several interference problems.

Some systems use tracking algorithms to improve area differentiation, but those methods normally require frequent location update. If the update rate of the location is several minutes or even hours a reliable tracking becomes very difficult.

Therefore, it would be desirable to provide a method that overcomes the problems associated with prior art methods. The method will allow for absolute area differentiation without the need of expensive infrastructure deployment. The method will allow dynamic programming of a transmitter (tracked unit) to allow the location system to absolutely differentiate between areas.

SUMMARY OF THE INVENTION

In accordance with one embodiment of the present invention, a method for tracking and locating wireless tags in limited and well defined areas that provides for differentiation between the well defined areas is disclosed. The method comprises: installing location receivers in the well defined areas to locate wireless tags; installing short range transmitters in the proximity of entrance/exit points in the well defined areas, each short range transmitter will transmit identifying area information; receiving the identifying information by any of the wireless tags in coverage range of one of the short range transmitters; and transmitting the identifying information which is transmitted in the tag message, transmission will include the last identifying information received and accepted by the wireless tag.

In accordance with another embodiment of the present invention, a method for tracking and locating wireless tags by a wireless location system in limited and well defined areas that provides for differentiation between the well defined areas is disclosed. The method comprises: transmitting identifying area information by short range transmitters, at least one short range transmitter positioned in and/or in the proximity of entry and exit points of each well defined area; receiving the identifying area information by any of the wireless tags in coverage range of one of the short range transmitters; transmitting the identifying area information which is transmitted in the tag message, transmission will include the last identifying information received and accepted by the wireless tag; receiving the transmitted identifying information by the wireless location system; and locating the wireless tags by using location receivers and/or access points installed in and/or in the proximity of the well defined area.

In accordance with another embodiment of the present invention, a wireless location system for tracking and locating a wireless tag in a limited and well defined area that provides for differentiation between the well defined areas is disclosed. The wireless location system has a plurality of short range transmitters. At least one short range transmitter is positioned in the proximity of entry and exit points of each well defined area for transmitting identifying area information. A plurality of wireless tags is provided wherein each wireless tag transmits the identifying information in the tag message. The transmission will include the last identifying information received and accepted by the wireless tag. A plurality of location receivers and/or access points is installed in and/or in the proximity of the well defined area for locating the wireless tags.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings, wherein like reference numerals and symbols represent like elements.

DESCRIPTION OF PREFFERED EMBODIMENT

The present invention describes a method that will allow for area differentiation without the need of expensive infrastructure deployment. The method will allow dynamic programming of a transmitter (e.g. a wireless tag) to allow the location system to differentiate between areas. The present method describes a method where a short range transmitter unit is used to program tracked devices (e.g. wireless tag) while in range of that short range transmitter, to transmit an area ID in the message used for location purposes.

For the sake of simplicity, the following description of the preferred embodiments refers to location receivers but it shall be understood that it also applies to other units such WLAN access points, RFID receivers, etc. performing location in a WLAN network or any other wireless communication network.

Figure 1:
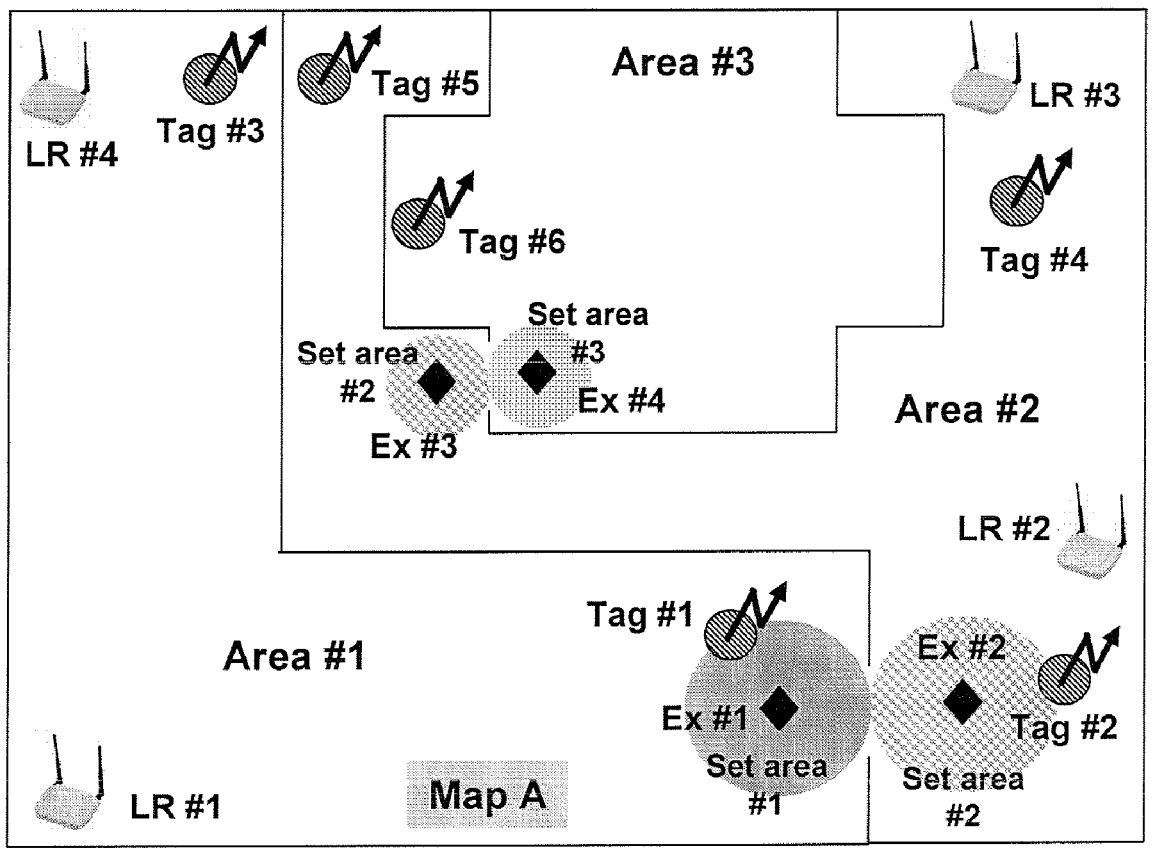
FIG. 1 shows a map with a system for absolute area differentiation.

Referring to FIG. 1, a location system installed in an area defined as map #A is shown. The location system covers three well defined areas (areas #1-#3). The location method used to locate tags #1-5 may be by measuring RSSI, TOA, TDOA or any other commonly used wireless location method.

The requirement is to locate the tags within the well defined areas in a very reliable way. This means that the system can locate the tags with certain accuracy (derived from the location method and environment) but with absolute area differentiation.

Describing a preferred embodiment of the method and referring to Map A in FIG. 1, there are three areas (Area #1 to Area #3). Each of the areas (Area #1-#3) perimeters is limited by walls, shown as black lines in Map #A. The movement between the different areas (Area #1-#3) is done through doors which are shown as openings in the walls in Map #A (i.e., between Area #1 and #2 in the right bottom corner and between Area #2 and #3 in the center of the picture). The location within all those areas is performed by four Location Receivers (LR#1-#4). The location method in this preferred embodiment is either by RSSI and/or TDOA.

A short range (normally up to few meters) transmitter covering a well defined range is installed on both sides of each door. In a preferred embodiment, the transmitters (EX#1-#4) are low frequency (125 KHz) RFID transmitters or exciters. However, transmitters (EX#1-#4) may be of any other type and transmit at other frequencies (HF, VHF and UHF bands) without departing from the spirit and scope of the present invention.

The term "exciter" refers to any device, normally a short range transmitter that uses this method of ID, and not just low frequency devices.

Each of the transmitters (EX#1-EX#4) continuously broadcasts messages which include among other parameters their transmitter ID and an area ID. For example EX#1 transmits Area #1, while EX#2 and EX#3 transmit Area #2 and EX#4 transmits Area #4.

A tag (Tag #1-#6) which is in the coverage range of one of the transmitters (EX#1-EX#4) receives the corresponding area ID which is subsequently transmitted in every tag message.

Referring to FIG. 1, Tag #1 which is in the coverage area of Transmitter EX#1 is programmed to transmit area #1 in its messages and Tag #2 which is in the coverage area of transmitter EX#2 is programmed to transmit area #2 in all its messages. However Tag#3 which is not in the coverage area of any of the transmitters (EX#1-EX#4), still transmits area #1 since this was the last programmed area for this specific tag Tag#3. The same is true for Tags #4 and #5 which transmit area #2 and Tag #6 which transmits area #3. As can be observed, it's not important how the tags (Tag #1-#6) move between the areas (Area #1-#3). The transmission will always include the last programmed area.

The location system receives the tag messages and performs location using Location Receivers LR#1 to #4. Although this location maybe inaccurate it will always be done within the areas as defined in the system. In the above example Tag#3 and Tag #4 are very close to a wall and without this differentiation method there was a good probability to locate them in a wrong area. This method ensures full and absolute differentiation even when the tag is not anymore in the coverage range of the transmitters (EX#1-EX#4).

In other preferred embodiments the concept of area ID is enhanced to consist of several hierarchical layers (e.g. map and cell, floor and room, building, floor and room). In this preferred embodiment, a transmitter can program each or all of those layer identifiers (e.g. floor only, room only, floor and room or any combination thereof). One particular option is to program the tag to "no area ID" which means that the tag can be located everywhere. Area ID's can describe specific areas or group of areas.

Figure 2:
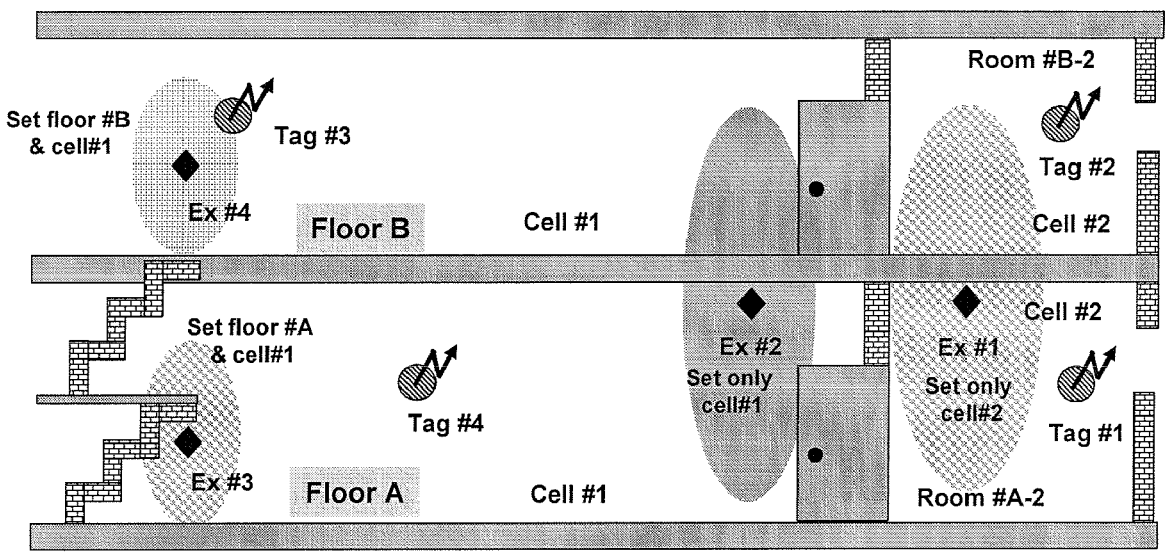
FIG. 2 shows a map with a system for absolute area differentiation installed on multiple floors.

Referring to FIG. 2, the location system covers a two floor building, each floor consisting of a general area called cell#1 and a closed room called cell#2. Room #A-2 is Cell#2 in Floor A and Room #B-2 is Cell #2 in Floor B. The movement between the floors is done through the staircase on the right side of each floor.

In this preferred embodiment four transmitters (exciters) (EX#1-EX#4) are installed. Units EX#1 and EX#2 are installed in a way that their coverage area includes both floors. Thus, a tag entering into room A-2 or room B-2 is captured by EX#1. EX#1 and EX#2 programs the tag to cell #1 or #2 respectively, without altering the floor ID Alternatively, EX#3 and EX#4 both program the tag to floor and cell, each one to its respective floor.

Thus Tag#1 in room A-2 will transmit floor #A and cell #2 while Tag #2 will transmit floor #B and cell #2. In this preferred embodiment, a tag moving from floor to floor will be programmed on the staircase and it will transmit the ID of the floor that was last programmed. It should be noted that the transmitters (exciters) can also be located in the proximity of elevators, passages, staircases or any desired combination.

As can be understood from this preferred embodiment, this method allows very easy and reliable floor differentiation, also when working with open floors where the RSSI separation is very unreliable. In addition, this method allows using a single transmitter (exciter) to cover more than one floor thus significantly reducing the infrastructure cost.

In other preferred embodiments, different exciters can be used to cover cells in different floors. In other preferred embodiments, cells or areas may or may not overlap, exciters can be installed in and/or in the proximity of more than one entrance or exit to a specific area, cell or floor and tags can be configured as required by the application.

In addition, exciters can be programmed by the location system to dynamically change the broadcasted message to the tags. In this preferred embodiment, the areas or cells can be changed dynamically during system operation, thus achieving flexible definition of areas according to the application needs.

Figure 3:
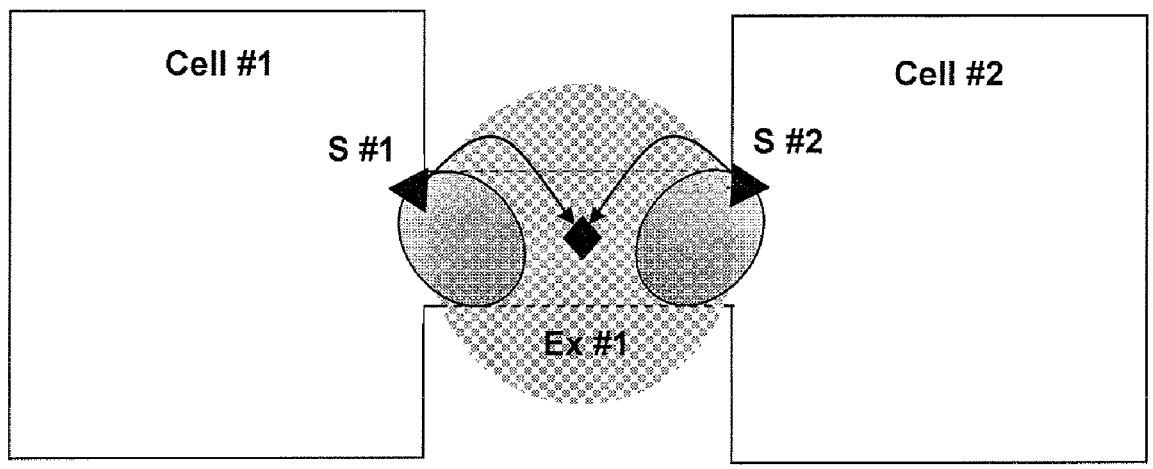
FIG. 3 shows exciters with proximity sensors.

In another preferred embodiment, and referring to FIG. 3, a single exciter is installed in the proximity to a point of entrance/exit (instead of two units, one on each side). Sensors connected to the exciter indicate to it which message to broadcast. For example, let's assume that those sensors are proximity sensors (S#1 and S#2) each of them covering a specific area as shown in FIG. 3.

When S#1 detects the proximity of an object or person (e.g. carrying a tag), it indicates to the exciter to broadcast a message programming the tags to cell #1. When the sensor S#2 detects an object or person it indicates the exciter to broadcast a message programming the tags to cell #2.

Although this embodiment is limited to movement of tags in a single direction at any given time, it reduces to half the exciters needed at a single point. In other cases those sensors may be replaced by signals directly received from electrical doors, etc.

In another preferred embodiment, the exciters can program the tags for a specific area ID and in addition program them to ignore transmissions from other exciters which are transmitting from a different area ID. This method is especially valuable when the area covered by a specific exciter exceeds the desired coverage area (e.g. an exciter is received in the upper floor although the desired area is only a room entrance located in the lower floor). In that case it is desirable to ignore messages from said exciter when the tag is in those areas unintentionally covered by said exciter.

An additional preferred embodiment includes tags that transmit the identifying area ID only in part of the transmitted messages. The system will locate the tags according to the last transmitted area ID.

As can be easily understood from the above description, the same exciters used for area programming, can also be used at the same time and using the same broadcast messages, to configure the tags to different parameters including but not limited to: blink rate, transmission power, channel(s) number, activation/deactivation, etc.

The above system and method has several advantages over the prior art. First, the above system and method provides for simple implementation. Generally exciter installation is a fairly simple process and since they have a programmable range, a good solution can be provided to almost any type of installation. This system and method does not require covering complete areas with exciters, just the entrance/exit points, hallways, corridors or passages. Since the exciters are broadcast devices, there is no limitation to the number of tags entering/exiting through a single point at the same time. Second, the above system and method provides better performance than prior art systems and methods. The present system and method ensures excellent performance in respect to area differentiation. RFID messages are short and reliable, thus providing virtually 100% success rate. Third, the present system and method provides for flexibility. The present system and method supports many configuration models, where exciters may program the tag to one or more identifiers This flexibility allows optimization of the system in respect to cost and functionality. In addition, this programming can be modified dynamically based on application requirements. The present method for area differentiation is independent from the method used to locate the tags. Fourth, the present system and method provides autonomy. The exciters (programming transmitters) can be installed as stand-alone units without any link to the location system.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method for tracking and locating wireless tags in limited and well defined areas that provides for differentiation between the well defined areas comprising:

installing location receivers in a proximity of the well defined areas to locate wireless tags;
    installing short range transmitters installed in a proximity of entrance/exit points, said entrance/exit points connecting between said well defined areas, said short range transmitters transmit area identifying information related to a specific defined area where each short range transmitter is located;
    receiving the identifying information by the wireless tags in coverage range of any of the short range transmitters;
    programming each wireless tag in the coverage range of any of the short range transmitters with the identifying information of the short range transmitter of which the wireless tag is in coverage range, wherein each wireless tag is reprogrammed with new identifying information when in coverage range of a different one of the short range transmitters; and
    transmitting the identifying information which is transmitted in a tag message by each wireless tag, said transmission including the identifying information last received and programmed into each wireless tag.

2. The method of claim 1 further comprising locating the wireless tags by the location receivers using one of RSSI or TDOA location methods.

3. The method of claim 1 further comprising installing short range transmitters which are low frequency REID transmitters.

4. The method of claim 1 wherein each short range transmitter continuously broadcasts transmitter ID and an area ID information.

5. A method for tracking and locating wireless tags by a wireless location system in limited and well defined areas that provides for differentiation between the well defined areas comprising:

installing location receivers in a proximity of the well defined areas to locate wireless tags;
    installing short range transmitters installed in a proximity of entrance/exit points, said entrance/exit points connecting between said well defined areas, said short range transmitters transmit area identifying information related to a specific defined area where each short range transmitter is located;
    receiving the identifying information by the wireless tags in coverage range of any of the short range transmitters;
    programming each wireless tag in a coverage range of one of the short range transmitters with the identifying information of the short range transmitter of which the wireless tag is in coverage range, wherein each wireless tag is reprogrammed with new identifying information when in coverage range of a different one of the short range transmitters; and
    transmitting the identifying information which is transmitted in a tag message by each wireless tag, said transmission including the identifying information last received and programmed into each wireless tag;
    receiving the transmitted identifying information by the wireless location system; and
    locating the wireless tags by using location receivers installed in a proximity of the well defined area, the location receivers determining which defined area each wireless tag is located by the identifying information transmitted by each wireless tag and the location in the defined area.

6. The method of claim 5 further comprising installing short range transmitters on each side of doors in the well defined areas.

7. The method of claim 5 further comprising installing short range transmitters in the proximity of the top and bottom of stairwells, elevators, and accesses connecting between the well defined areas.

8. The method of claim 5 further comprising locating the wireless tags by the location receivers using one of RSSI or TDOA location methods.

9. The method of claim 5 further comprising installing short range transmitters which are low frequency REID transmitters.

10. The method of claim 5 further comprising continuously broadcasting transmitter ID and an area ID information by each short range transmitter.

11. A wireless location system for tracking and locating a wireless tag in a limited and well defined area that provides for differentiation between the well defined areas comprising:
   a plurality of short range transmitters, at least one short range transmitter positioned in the proximity of entry and exit points of each well defined area for transmitting identifying area information;
   a plurality of wireless tags, wherein each wireless tag is programmed when in a coverage range of one of the short range transmitters with the identifying information of the short range transmitter of which the wireless tag is in coverage range, each wireless tag is reprogrammed with new identifying information when in coverage range of a different one of the short range transmitters, each wireless tag transmits the identifying information in a tag message, the transmission will include the last identifying information received and accepted by the wireless tag; and
   a plurality of location receivers installed in a proximity of the well defined area for locating the wireless tags, the location receivers determining which defined area each wireless tag is located by the identifying information transmitted by each wireless tag and the location in the defined area.

12. A wireless location system in accordance with claim 11 wherein at least one short range transmitter is installed in a proximity of each side of doors in the well defined areas.

13. A wireless location system in accordance with claim 11 wherein at least one short range transmitter is installed in a proximity of a top and bottom of stairwells, elevators, and accessed connecting between the well defined areas.

14. A wireless location system in accordance with claim 11 wherein the plurality of location receivers locate the wireless tags by using one of RSSI or TDOA location methods.

15. A wireless location system in accordance with claim 11 wherein the plurality of short range transmitters are low frequency REID transmitters.

16. A wireless location system in accordance with claim 11 wherein each of the plurality of short range transmitters continuously broadcast transmitter ID and an area ID information.

17. A method for tracking and locating wireless tags in limited and well defined areas that provides for differentiation between the well defined areas comprising:
   installing WLAN access points in a proximity of the well defined areas to locate wireless tags;
   installing short range transmitters in a proximity of entrance/exit points, said entrance/exit points connecting between said well defined areas, said short range transmitters transmit area identifying information;
   receiving the identifying information by the wireless tags in coverage range of one of the short range transmitters;
   programming each wireless tag in a coverage range of one of the short range transmitters with the identifying information of the short range transmitter of which the wireless tag is in coverage range, wherein each wireless tag is reprogrammed with new identifying information when in coverage range of a different one of the short range transmitters; and
   transmitting the identifying information which is transmitted in a tag message, said transmission including a last identifying information received and accepted by each of the wireless tags.

18. The method of claim 17 wherein the short range transmitters are installed on each side of doors in the well defined areas.

19. The method of claim 17 further comprising installing short range transmitters in the proximity of the top and bottom of stairwells, elevators, and accesses connecting between the well defined areas.

20. The method of claim 17 wherein the short range transmitters are installed on an entrance and exit of each access point into and out of each well defined area.

* * * * *